United States Patent [19]

Nishikawa et al.

[11] 3,801,200

[45] Apr. 2, 1974

[54] APPARATUS FOR MOUNTING CONTACT SCREEN IN A PROCESS CAMERA

[76] Inventors: Yukio Nishikawa, 9-2, Kamigamo Sakuramachi; Yoshio Nagao, 9-7, Kamigamo Sakuramachi, both of Kyoto; Iwao Hirose, 720-48 Urushida Nishi Imacho, Shiga, all of Japan

[22] Filed: Dec. 15, 1972

[21] Appl. No.: 315,471

[52] U.S. Cl............... 355/18, 96/116, 355/53
[51] Int. Cl. ......................... G03b 27/42
[58] Field of Search ............ 355/53, 18, 74; 96/45, 96/116

[56] References Cited
UNITED STATES PATENTS

| | | | |
|---|---|---|---|
| 1,535,225 | 4/1925 | Hay et al. .............................. 96/116 |
| 2,062,401 | 12/1936 | Disque et al.......................... 96/116 |
| 2,115,233 | 4/1938 | Powers................................. 96/116 |
| 2,564,934 | 8/1951 | Sussin.................................. 96/116 |
| 2,981,625 | 4/1961 | Powers et al. ......................... 96/45 |
| 3,041,931 | 7/1962 | Anander............................... 96/116 |
| 3,063,337 | 11/1962 | Anander............................... 96/116 |
| 3,068,748 | 12/1962 | Schutt et al.......................... 355/73 |
| 3,467,524 | 9/1969 | Gruver................................. 355/18 |
| 3,593,228 | 7/1971 | Miyauchi.............................. 355/18 |

FOREIGN PATENTS OR APPLICATIONS 1,522,038  6/1969  Germany .............................. 355/18

Primary Examiner—Richard L. Moses
Attorney, Agent, or Firm—Lilling & Siegel

[57] ABSTRACT

This invention provides apparatus for mounting a contact screen in a process camera such that the screen can be moved relative to a film backing in a direction perpendicular to the optical axis of the camera to and from a position where the screen is spaced from the film backing and a position where the screen is juxtaposed against the film backing without chafing of scratching the screen or film surfaces.

7 Claims, 7 Drawing Figures

APPARATUS FOR MOUNTING CONTACT SCREEN IN A PROCESS CAMERA

This invention relates to mechanism for handling a contact screen in a process camera and applying the screen to a film sheet on the face of a vacuum film support.

Heretofore, applying a contact screen to a vacuum film support for the purpose of producing a half-tone negative or positive in a roll film type process camera, there has been generally employed either a method in which a contact screen is lowered, by a suitable driving mechanism, from its original position suspended at a position in front and above a film support to a position juxtaposed to the entire surface of the film, and then a roller or other suitable means is rolled or slided over the contact screen thereby placing the contact screen in intimate contact with the film, or a method in which two rollers are used for the double purposes of fitting and detaching of the contact screen as for instance disclosed in U.S. Pat. No. 3,068,748.

However, the former method has a drawback that when the contact screen is moved up and down, static electricity is generated between the contact screen and the film or film support to attract the former to the latter, and as a consequence, friction takes place between the contact screen and the film support to produce scratches on the contact screen, resulting in deteriorating the product of photographic film and excessively shortening the life of the contact screen. The latter method of U.S. Pat. No. 3,068,748 has the advantage of not permitting an easy access to replace the screen or film because of the facing relationship of the screen and film holder and resulting in a relatively thicker, less streamlined device.

The present invention provides a novel method and mechanism for handling a contact screen in a process camera, which method and mechanism are free of the conventional defects such as referred to above and which also permit attachment and detachment of the contact screen relative to the film with no fear of causing damage to the screen or film.

In accordance with the present invention, there is provided in a photo-mechanical camera, a support frame for a flexible contact type half-tone screen with the frame being displaced in a direction perpendicular to the optical axis of the camera from a film backing; the support frame and film backing are relatively movable to and from a position where they are in a spaced relation and in a position where they are juxtaposed to each other. A contact type half-tone screen is supported in the support frame such that one end is rigidly connected to the frame and the second edge is resiliently attached to the frame. The screen is to be pressed against a film sheet on the face of the film backing when the screen support frame and the film backing are moved from their spaced relation into juxtaposed relation. A film sheet can preferably be attached to the film backing by vacuum. When the screen support assembly and film backing are moved into juxtaposed relationship, the screen support assembly and the film backing initially are in contact along only one of each of their edges; the opposite edges are maintained apart by a movable spacer means. The screen is pressed into contact with a film on the film backing by a roller which initially presses against the screen adjacent the edge in contact with the film backing and which moves along the face of the screen so as to gradually press the screen into contact with a film on the film backing along the entire surface of the screen. That is, a combination of the resilient attachment at one end of the screen and the movable function of the spacer means permits the entire screen to be gradually pressed into contact against the film along its entire surface. The roller means is preferably moved along guide means which insures that the roller moves along a plane parallel to the surface of the screen; preferably the roller is biased so as to press perpendicularly against the surface of the screen. The roller can be automatically operated, as with an electric motor, or it can be manually operated. The roller, however, is not activated until the film backing and the screen retainer assembly are in the juxtaposed relationship. As the roller means returns to its original position, the screen is gradually pulled perpendicularly away from the film backing until the screen is completely out of contact with the film and the screen retainer assembly and the film backing can be displaced from their juxtaposed relationship.

The invention is now described in detail by way of a preferred embodiment with reference to the accompanying drawings, in which.

Figure 1:
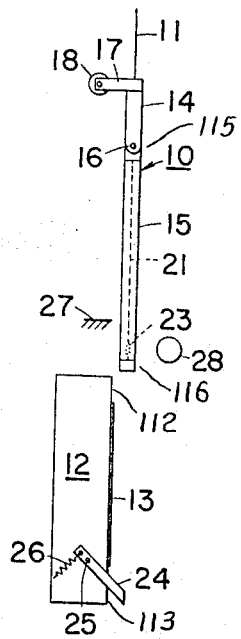
FIGS. 1 to 4 are diagramatic sketches depicting the movement of the apparatus of this invention in practicing the method of the present invention.
Figure 2:
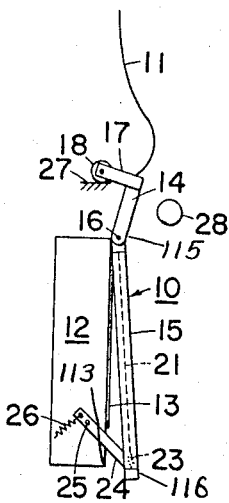
Figure 3:
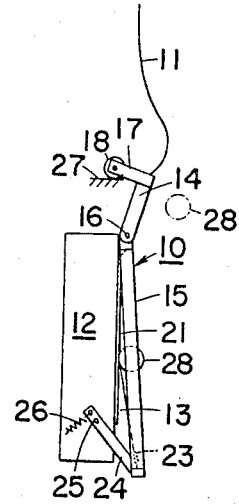
Figure 4:
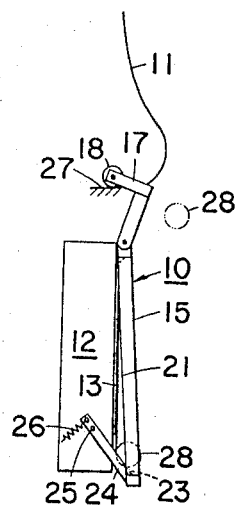

In the preferred embodiment illustrated in the drawings, the screen retainer assembly is vertically movable from a position above the film backing downwardly to a position juxtaposed to the film backing. In other words, along a direction perpendicular to the optical axis of the camera. This relative vertical movement can of course be obtained by mounting the screen retainer assembly or the film backing so that either or both can be vertically moved within the process camera. In the preferred embodiment shown in the drawing, the screen retainer assembly is vertically movable.

Referring to the drawings, the apparatus according to the present invention includes a screen retainer assembly 10 which is connected to cord 11. The cord 11 can move the assembly 10 in a vertical direction to a position adjacent to a vacuum suction type film backing 12 having an upper edge 112 and a lower edge 113, which carries a film 13 on its front side, this is the position as shown in FIG. 1. The screen retainer assembly 10 comprises a holder 14 and a screen retaining frame 15, with the lower end of the holder pivotally joined to the upper end of the screen retaining frame by a horizontal pin 16. The holder 14 has an arm portion 17 that projects horizontally from its top end and which carries at its end an engaging roller 18 pivoted about a horizontal axis 18a.

Provided inside the upper edge 115 of said retaining frame 15 is a screen holding or clamping means 19 which is rigidly attached to the frame 15 but which can be moved up and down to carry screens of different sizes by operating screws 20 and which is adapted to clamp the top edge of a screen 21; the bottom edge of said screen being clamped by a clamping means 22 which is joined to the lower edge 116 of said retaining frame 15 by means of tension springs 23, whereby said screen 21 is positioned in a tense stretched state within said retaining frame 15.

A lever 24, projecting outwardly from the film backing 12, is pivotably connected about a horizontal pin 25 to a lower part of said film backing 12. This lever 24 is given a rotational restorative force by a spring 26. The top surface of the projecting portion of lever 24 should preferably, as shown, project transversly downwardly in front of the film backing 12, so that when the retaining frame 15 descends to its lower limit as described later, the projecting portion of said lever 24 pushes the bottom edge 116 of said retaining frame 15 forwardly to keep it from touching the film surface.

Provided vertically below the roller 18, is a stopper 27, immovable with regard to the film backing, adapted to engage with said roller 18 when the retaining frame 15 has descended to its lower limit. The distances between the roller 18 and stopper 27 and between the bottom edge 116 of said retaining frame 15 and the projecting edge of said lever 24 are so given that said stopper 27 will engage the roller 18 after the rear side of the bottom portion of said retaining frame 15 touches the projecting end of said lever 24.

Figure 7:
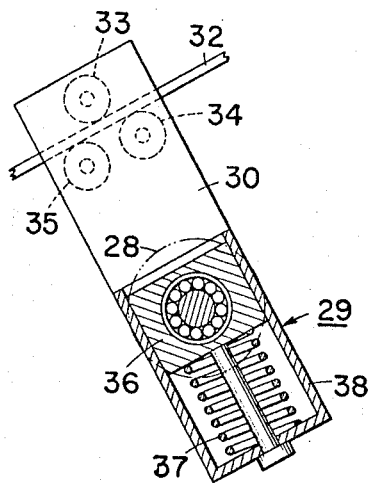
FIG. 7 is an enlarged vertical sectional view taken along the line 7—7 of FIG. 5.
Figure 5:
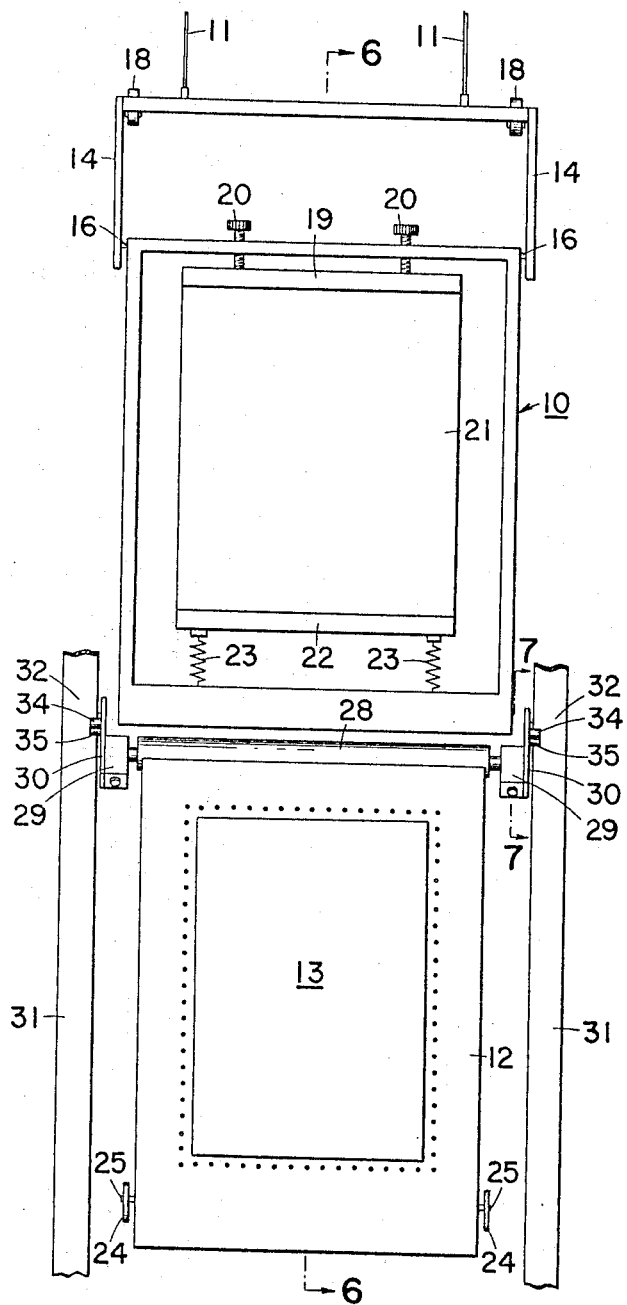
FIG. 5 is a front view showing the apparatus of the invention.
Figure 6:
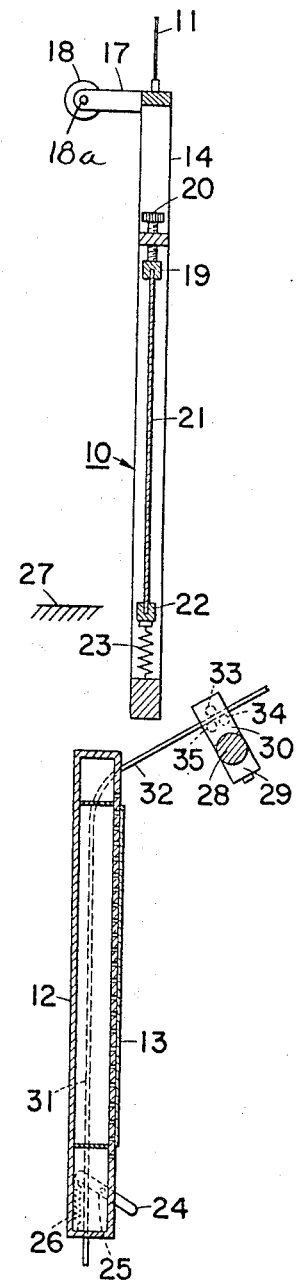
FIG. 6 is a vertical sectional side view taken along the line 6—6 of FIG. 5.

Vertical guide rails 31 are rigidly attached to either side of the film backing 12. The upper portions 32 of guide rails 31 are inclined outwardly away from the film backing 12. Runners 30 are movably connected to the guide rails 31 by three rollers 33, 34 and 35 each. As shown in FIG. 7, the runners 30 include bearings, generally indicated by 29; the bearings each comprise the bearing body 36, a bearing box 38 and a spring 37, loaded in the bearing box 38, such that the bearing body 36 is biased along a direction perpendicular to and towards the guide rails 31. A roller 28 is rotatably connected to the bearings 29 at each end.

The roller is normally positioned at the upper end of the guide rails 31 above and in front of the film backing 12. When the screen retainer assembly 10 is moved into juxtaposed position relative to the film backing 12, the roller 28 is moved into position so as to lightly press the screen 21 against the front face of the film backing 12. The pressure is exerted by the springs 37 in each runner 30 and retaining springs 23. As the roller is further lowered, it continues to press the screen 21 against the film backing 12 as shown in FIGS. 1 to 4, until, as in FIG. 4, the entire surface of the screen 21 is pressed against the film backing 12.

In operating the apparatus described above a screen 21 is placed in the screen retainer assembly 10 and film 13 is placed on the film backing 12. The screen retainer assembly 10 is then lowered, the bottom portion of the retaining frame 15 contacts the projecting end of the lever 24 on the film backing 12; the retainer assembly 10 continues to be lowered until the roller 18 engages stop means 27, the bottom portion of the retaining frame 15 is then pushed forwardly by the projecting end of lever 24 so that the screen retainer assembly 10 is pivoted about connecting pin 16 such that the inside face of the upper part of screen 21 contacts the upper part of the front side of the film 13 in the film backing 12.

The roller 28 is then activated, and lowered in a transverse direction towards the screen 21 until the roller 28 presses lightly against the upper portion of the screen 21; the roller is then lowered in a vertical direction defined by the guides 31, continuing to press the screen 21 against the film 13 until the entire screen 21 is in contact with the film 13. The roller is biased against the screen by the springs 37 in the runner body 30 and by the springs 23 which resiliently attach the screen 21 to the screen retainer assembly 10.

The above operation can be carried out manually, i.e., the screen retainer assembly 10 lowered manually and the roller means 18 activated manually, or automatically by, for example, electric motors which would cause the movement of the screen retainer assembly 10 and the film backing 12 relative to each other and in a direction perpendicular to the optical axis of the camera followed by automatic activation of the roller means 21 when the screen retainer assembly 10 and film backing 12 are in the desired juxtaposed position.

When the contact between the screen and the film is completed, the foller 28 can be returned to its original position; the screen 21, as the roller 28 returns to its original position, springs away from the film 13 in a direction substantially perpendicular to the surface of the film 13 so as to avoid any chafing between the two surfaces. When the roller is in its uppermost position, the screen retainer assembly 10 is pulled in a vertical direction by the cord 11, pivoting the top edge of the screen retainer assembly 10 out of contact from the film backing 12 and the screen retainer assembly 10 can then be moved away from the film backing 12.

According to the present invention, as described above, a contact screen 21, which is to be attached to a film 13, is first lowered to a position in front of the film 13 in such a manner that the former will not touch the latter, and then the screen is stuck fast to the film surface by pressing the former against the latter with a roller 28 from a direction substantially perpendicular to said film surface. For detaching the screen, said roller 28 is raised up whereby the portion of the screen which said roller 28 has passed is stripped off successively by dint of said springs 23 which pull the bottom edge of said screen. Thus, there is no possibility that the film and screen chafe against each other when attaching or detaching the screen to or from the film and hence the screen remains free of any damage of abrasion and is therefore appreciably elongated in its service life.

What is claimed:

1. An apparatus for mounting a contact screen in a process camera comprising:
   1. a film backing having a first edge and a second edge;
   2. a screen retainer assembly comprising a screen retainer frame, a first screen anchoring element rigidly attached to one edge of the screen retainer frame, /and a second screen anchoring element resiliently attached to a second edge of the screen retainer frame, said film backing and screen retainer assembly being relatively movable in a direction perpendicular to the optical axis of the camera to and from a position where the film backing is spaced from the screen retainer assembly and a position wherein the film backing and the screen retainer assembly are juxtaposed in contact along one of each of their edges;
   3. movable spacer means for separating the film backing from the screen retainer assembly at the other of each of their edges;
   4. roller guide means; and 5. a roller, movably attached to the roller guide means, designed and adapted to press a screen in the screen retainer assembly against the film backing initially at the edge in contact with the film backing and to move along the face of the screen so as to move the screen gradually into contact with the film backing along its entire surface, when the screen retainer assembly and film backing are moved into the juxtaposed position.

2. The apparatus of claim 1 comprising moving means for moving the screen retainer assembly in a vertical direction and wherein the screen retainer assembly is operatively connected to the moving means.

3. The apparatus of claim 2 comprising in addition stop means immovable with respect to the film backing and wherein the screen retainer assembly comprises in addition holder means pivotally connected to the top edge of the screen retaining frame and stop-engaging means rigidly attached to the holder means, the stop means and engaging means being so disposed that upon their mutual engagement the top edge of the screen retaining frame is pivoted into contact with the top edge of the film backing.

4. In a process camera comprising a film backing for supporting a film and a screen retainer assembly for holding a contact type half-tone screen in position against a film on the film backing, an improvement which results in close adhesion of the screen to the film surface during the processing but permits ready separation of the film without scratching or chafing of the film and screen against each other, the improvement comprising movable spacer means resiliently attached to the film backing at one edge, projecting outwardly from the film backing; a screen retainer frame within the screen retainer assembly comprising a first screen anchoring element rigidly attached to one edge of the screen retaining frame; a second screen anchoring element resiliently attached to a second edge of the screen retaining frame; means for moving the screen retainer assembly in a direction perpendicular to the optical axis of the camera to and from a position where the film backing is spaced from the assembly and a position wherein the film backing is in juxtaposition with the screen retainer assembly, the movable spacer means being so placed that the screen retainer assembly and film backing are in contact only along one of each of their edges; roller guide means rigidly attached to the film backing and in movable relationship thereto; a roller assembly movably supported by the guide means and so arranged that when the screen retainer assembly is in juxtaposed relationship to the film backing, the roller is guided to press the face of a screen in the screen retainer frame against the film backing and can be moved parallel to the film backing so as to press the entire screen against the film backing in a direction substantially perpendicular to the film backing.

5. The process camera of claim 4, wherein the screen retainer assembly moves in a vertical direction relative to the film backing.

6. The process camera of claim 5, wherein the screen retainer assembly moves from a position above the film backing downwardly to a position in juxtaposed relationship to the film backing, the elements of the assembly being arranged and adapted to accomplish this result.

7. The apparatus for mounting a contact screen in a process camera comprising a film backing; a screen retainer assembly comprising a screen retaining frame, a first screen anchoring element rigidly attached to the top edge of the screen retaining frame, a second screen anchoring element resiliently attached to the lower edge of the screen retaining screen; means for moving the screen retainer assembly to and from a position above and horizontally forward of the film backing face and a position in juxtaposition with the film backing face; holder means pivotally connected to the screen retainer assembly; a stop-engaging portion projecting rearwardly from the holder means towards the film backing rigidly connected to the holder means; stop means in immovable relationship to the film backing; movable spacer means resiliently attached to the film backing and projecting forwardly from the film backing towards the screen retainer assembly; the combined apparatus being designed and adapted such that when the screen retainer assembly is lowered into its juxtaposed position with the film backing, the stop means being places so as to engage the stop-engaging means after the lower edge of the screen retainer assembly engages the movable spacer means such that the upper edge of the screen retainer assembly is pivoted inwardly to contact the upper edge of the film backing and the lower edge of the screen retainer assembly is pivoted forwardly away from the lower edge of the film backing; roller guide means attached to the film backing; a roller assembly designed and adapted to move along the roller guide means when the screen retainer assembly is in its juxtaposed position with the film backing so as to pressingly engage the screen and press the screen against the film backing and to move downwardly along the screen so as to gradually press the entire face of the screen against the film backing, the roller means being positioned along a substantially horizontal axis.

* * * * *